United States Patent
Spagnolini et al.

(10) Patent No.: US 12,418,782 B2
(45) Date of Patent: Sep. 16, 2025

(54) SYSTEM AND METHOD OF COMMUNICATION BETWEEN A VEHICLE AND AN AGENT

(71) Applicant: POLITECNICO DI MILANO, Milan (IT)

(72) Inventors: Umberto Spagnolini, Milan (IT); Marouan Mizmizi, Milan (IT)

(73) Assignee: POLITECNICO DI MILANO, Milan (IT)

( * ) Notice: Subject to any disclaimer, the term of this patent is extended or adjusted under 35 U.S.C. 154(b) by 415 days.

(21) Appl. No.: 17/923,932

(22) PCT Filed: May 10, 2021

(86) PCT No.: PCT/IB2021/053966
§ 371 (c)(1),
(2) Date: Nov. 8, 2022

(87) PCT Pub. No.: WO2021/224896
PCT Pub. Date: Nov. 11, 2021

(65) Prior Publication Data
US 2023/0269566 A1    Aug. 24, 2023

(30) Foreign Application Priority Data
May 8, 2020  (IT) .................. 102020000010300

(51) Int. Cl.
*H04W 4/00* (2018.01)
*G01S 7/00* (2006.01)
(Continued)

(52) U.S. Cl.
CPC ............... *H04W 4/46* (2018.02); *G01S 7/003* (2013.01); *H04W 4/38* (2018.02); *G01S 2013/9316* (2020.01); *G01S 2013/9323* (2020.01)

(58) Field of Classification Search
CPC .......... H04W 4/46; H04W 4/38; G01S 7/003; G01S 2013/9316; G01S 2013/9323; G01S 13/931
See application file for complete search history.

(56) References Cited

U.S. PATENT DOCUMENTS 10,194,264 B2 * 1/2019 Azevedo ................. H04W 4/70
10,331,128 B1 * 6/2019 Hansel ..................... H04L 9/30
(Continued)

OTHER PUBLICATIONS

Wang et al., "Networking and Communications in Autonomous Driving: A Survey", IEEE Communications Surveys & Tutorials, 2019, vol. 21, No. 2, pp. 1243-1274.
(Continued)

*Primary Examiner* — Md K Talukder
(74) *Attorney, Agent, or Firm* — Maier & Maier, PLLC

(57) ABSTRACT

A method of communication between two agents, at least one of which is a mobile vehicle, where a first agent includes at least one sensor and a second agent includes a second sensor. The second agent sends to the first agent, via a radio link, features and control parameters of the second sensor necessary to directly query the second sensor. The first agent sends to the second sensor a request for data selected by the first agent on the basis of a selection criterion dependent on the features of the second sensor, the request generated using the control parameters of the second sensor. The second agent sends to the first agent the second sensor's data requested with said data request. Several agents adapted to implement the method are also described.

23 Claims, 9 Drawing Sheets

(51) Int. Cl.
*H04W 4/38* (2018.01)
*H04W 4/46* (2018.01)
*G01S 13/931* (2020.01)

(56) References Cited

U.S. PATENT DOCUMENTS

| | | | | |
|---|---|---|---|---|
| 2014/0308902 | A1* | 10/2014 | Ricci | G08G 1/096811 455/66.1 |
| 2018/0365909 | A1* | 12/2018 | Cheng | H04Q 9/00 |
| 2019/0130754 | A1* | 5/2019 | Mueck | G08G 1/163 |
| 2019/0324450 | A1* | 10/2019 | Lurie | H04L 12/40026 |
| 2020/0068434 | A1* | 2/2020 | Pedersen | H04W 4/46 |
| 2022/0332350 | A1* | 10/2022 | Jha | B60W 60/0017 |
| 2023/0269566 | A1* | 8/2023 | Spagnolini | G01S 7/003 455/39 |

OTHER PUBLICATIONS

Pendleton et al., "Perception, Planning, Control, and Coordination for Autonomous Vehicles", Machines, 2017, vol. 5, No. 6, pp. 1-54.
Muoio, "Tesla's Autopilot system is partially to blame for a fatal crash, federal investigators say", Business Insider, 2017, pp. 1-3, http://www.businessinsider.com/tesla-autopilot-fatal-crash-ntsb-2017-9.
Efrati, "Uber Finds Deadly Accident Likely Caused By Software Set to Ignore Objects On Road", The Information, 2018, pp. 1-4, https://www.theinformation.com/articles/uber-finds-deadlyaccident-likely-caused-by-software-set-to-ignore-objects-on-road.
Charlton, "Report: Uber's use of single lidar sensor caused blind spots on driverless cars", Gearbrain, 2018, pp. 1-3, https://www.gearbrain.com/uber-autonomous-car-lidar-sensor-2554386301.html.
"Velodyne Lidar", 2023, 4 pages. https://velodynelidar.com/products/hdl-64e/.
Chen et al., "Cooper: Cooperative Perception for Connected Autonomous Vehicles based on 3D Point Clouds", 2019 EEE 39th International Conference on Distributed Computing Systems, 2019, pp. 1-11, https://arxiv.org/pdf/1905.05265.pdf.
Kenney, "Dedicated Short-Range Communications (DSRC) Standards in the United States", Proceedings of the IEEE, 2011, vol. 99, No. 7, pp. 1162-1182.
Va et al., "Millimeter Wave Vehicular Communications: A Survey", Foundations and Trends in Networking, 2015, vol. 10, No. 1, pp. 1-116.
Choi et al., "Millimeter-Wave Vehicular Communication to Support Massive Automotive Sensing", Automotive Networking and Applications, Dec. 2016, vol. 54, No. 12, pp. 160-167.
Giordani et al., "Millimeter Wave Communication in Vehicular Networks: Challenges and Opportunities", 2017 6th International Conference on Modern Circuits and Systems Technologies (MOCAST), 2017, pp. 1-6.
Liu et al., "Design aspects on physical layer structure for 5G V2X and related issues", 2021 IEEE 93rd Vehicular Technology Conference, 2021, pp. 1-5.
Sakaguchi et al., "Where, When, and How mmWave is Used in 5G and Beyond", IEICE Transactions on Electronics, 2017, vol. 100, No. 10, pp. 790-808.
Powell et al., "Vehicle-to-Vehicle Communications: Readiness of V2V Technology for Application", U.S. Department of Transportation., National Highway Traffic Safety Administration, Aug. 2014, pp. 1-327.
"ETSI TR 102638: Intelligent Transport Systems (ITS); Vehicular Communications; Basic Set of Applications; Definitions", ETSI TR 102 638 V1.1.1, Jun. 2009, pp. 1-81, http://www.etsi.org/deliver/etsi_tr%5C102600_102699%5C102638%5C01.01.01_60%5Ctr_102638v010101p.pdf.
"Product Code: SAE J2945(TM)/2 Standard ASN-201902", SAE International, 49 pages.
Carlaw et al., "54 Technology Trends to Watch in 2020", ABI Research, 2019, pp. 1-36.
International Search Report mailed on Sep. 29, 2021 in connection with corresponding International Patent Application No. PCT/IB2021/053966, 3 pages.

* cited by examiner

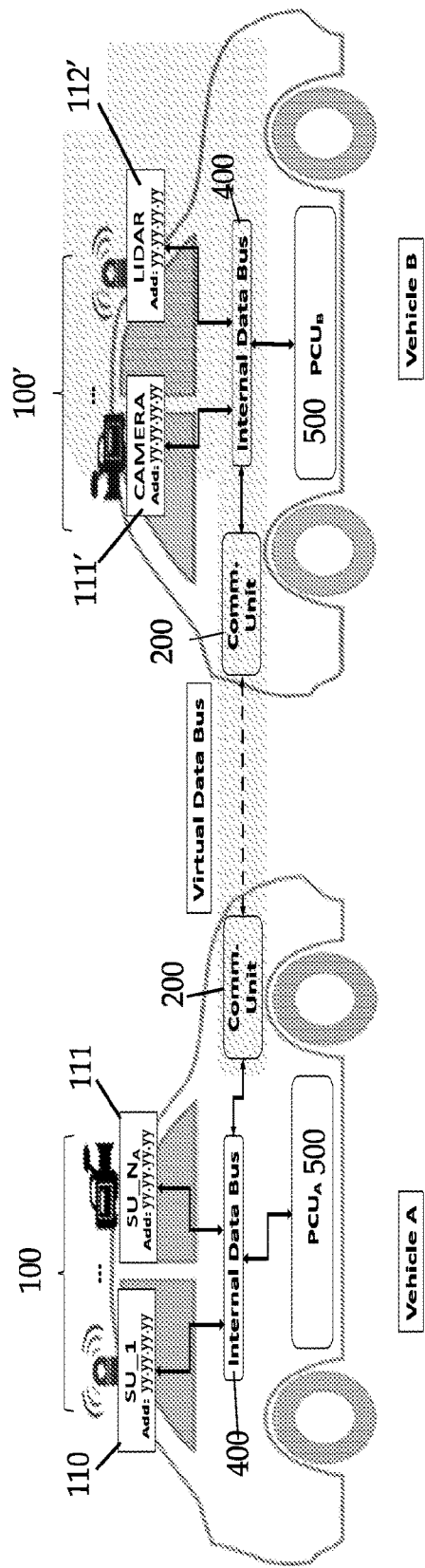
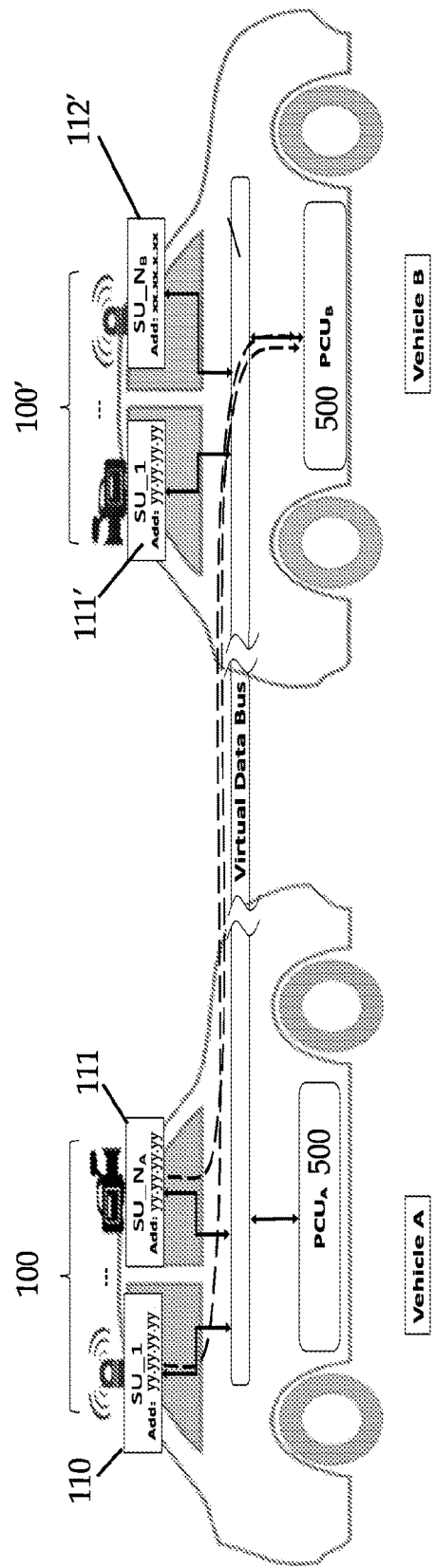
Fig. 2
Fig. 3

SYSTEM AND METHOD OF COMMUNICATION BETWEEN A VEHICLE AND AN AGENT

TECHNICAL FIELD

The present invention relates to an autonomous driving system, and in particular to a method of communication between a vehicle and at least one road surveillance device equipped with sensors.

BACKGROUND

Autonomous driving is one of the biggest technological challenges of our time and is expected to significantly improve the safety and efficiency of our transport networks.

Cars of the future need to be cognizant of the context in which they are located, the precise position of the vehicle could be estimated through the combination of Digital Maps (DM), Global Navigation System (GPS) and Inertial Measurement Units (IMU), while information about the surrounding environment is obtained with on-board sensors such as multiple cameras, LIght Detection And Ranging (LIDAR) and RAdio Detection And Ranging (RADAR). Each of these sensing units (SUs) contributes to a partial detection of the surrounding environment, and the fusion of multiple SUs contributes to enhance the perception of the surrounding environment necessary for driving safety and control. Typically, all these SUs are collected in the so-called Perception Layer (PL) of the vehicle for enhanced perception.

However, on-board sensors have a limited field of view and can fail in the presence of obstacles or special weather conditions, causing serious accidents. Tesla's accident in 2016 and the more recent Uber's accident in 2018 are tragic examples of sensor unreliability.

A partial countermeasure adopted so far is to equip vehicles with more sensors, e.g. Uber's car has 7 LIDARs, 7 Radars and 20 cameras; Volvo's autonomous car has one LIDAR, 10 Radars and 7 cameras. However, the installation cost of the autonomous vehicle is increasing, e.g. launched the HDL-64E LIDAR at $75,000 and the higher performant VLS-128 LIDAR, which is expected to be even more expensive. Consequently, the choice of using high-precision sensors and/or an increasing number thereof is costly and inefficient.

As an alternative to increasing the number of sensors per car, it is possible to exploit the advantages of new inter-vehicle communication technologies to enable the cooperation among vehicles in order to improve the perception of the surrounding environment without increasing the number of on-board sensors.

In general, existing applications for cooperative perception sharing follow the conceptual scheme in FIG. 1, where two vehicles 1000 and 2000 use respective sensors 1001 and 2001 to detect objects in the surrounding environment. Each vehicle is equipped with a processing unit (1002, 2002) and accesses its sensors via a communication bus internal to the vehicle. The processing unit processes the data and exchanges the aggregate results of the detection as an occupancy of an obstacle (e.g., bicycle, pedestrian) in space, sometimes with an index of reliability, speed, and direction of moving objects in the driving range to the other vehicle via a communication unit (1003,2003). In the example in FIG. 1, the vehicle A receives this information in a Cooperative Perception Message (CPM) 3000. The vehicle 1000 uses high-level data fusion algorithms 1005 to fuse the CPM received from the vehicle B with the data of the objects detected by the internal sensors 1001 and provide the aggregate information to the perception layer 1006 based on which decisions are made to control the vehicle 1000.

These solutions that perform a CPM fusion feature several problems. For example, each vehicle collects voluminous data from its sensors and produces a categorization of the objects and obstacles, the latter are exchanged with other vehicles in the form of occupancies in space, and the local pre-classification allows the volume of data exchanged to be reduced by at least a factor of 1/1000. Moreover, due to physiological errors in the detection algorithms, if the same object is observed by different vehicles, it might result in different positions, it might be perceived by some vehicles and not by others, as well as have different speeds. Furthermore, information about street topology or static objects such as buildings, parked cars, or trees may be omitted. The main limitation of these solutions is therefore that each processing unit does local processing, with reliability and accuracy dependent on the specific sensing system.

Qi Chen et al., describe an example of cooperative perception in which vehicles connected in DSRC (Dedicated Short-Range Communication) cooperate by exchanging data without any prior classification acquired by their respective sensors. Therefore, an intelligent vehicle can combine its own data with data from other vehicles to improve the perception capability, and thus improve the detection accuracy and the driving safety. To cope with the bandwidth limitations of DSRC communication, a data extraction strategy based on a Region of Interest (ROI) is adopted. Depending on the scenario encountered by the vehicle, a ROI is defined and data related thereto are extracted. In order for the system to be able to work efficiently, however, the system would require a multitude of real-world ROI categories that provide a guideline for deciding how many data should be transmitted in order to achieve an optimal balance between the size of the transmitted data and the required detection accuracy.

Cooperative perception among vehicles thus appears to be a solution to the problem of cost and number of sensors that must be mounted on board a single vehicle, but clashes with the available band. For example, a vehicle equipped with cameras, LIDARs and radars can generate a data rate of 10 Gbps, while DSRC technology based on IEEE 802.11p standards operates in the 5.9 GHz band and allows a data rate in the order of 100 Mbps. Similarly, the new 5G vehicular system (C-V2X), which operates in the frequency bands below 6 GHz, has no chance of carrying this high data traffic either.

High-frequency bands (to exemplify, millimetre waves in the range 24-28 GHz, or 37-42 GHz, or 76-80 GHz, or 120 GHz-140 GHz, or higher up to THz frequencies) are now being developed for V2X communications as an attractive solution to complement the existing V2X technologies, such as C-V2X and/or DSRC, for lower frequencies. Thanks to the large bandwidths (up to several GHz) of the high-frequency bands, these are expected to support advanced V2X applications at high data rates. In fact, the 24-28 GHz band is one of the key technologies in the new 5G radio network (New Radio, NR), with V2X being its main use case.

However, the high-frequency bands are unstable and currently allow communications for short time intervals.

Therefore, there is a need for a communication system among vehicles that enables a Cooperative Perception in an efficient manner. The 3GPP standardization body has already highlighted the need for a fusion of data from sensor units not previously processed, in order to guarantee a Cooperative Perception of the context where the vehicle(s) is/are moving, defining a set of minimum values, among which transmission rate, latency time and reliability. Therefore, 3GPP is geared towards defining efficient systems to enable high-speed V2X communication (>1 Gbps/link).

U.S. Ser. No. 10/194,264 B2 describes systems and methods for collecting data in a network that may have fixed and moving communication nodes. For example, the vehicles can be used as Wi-Fi hotspots.

US2020068434 describes methods and systems for processing images under bandwidth-limited conditions. A controlling apparatus detects the data rate of a signal received from a vehicle, said signal comprising a status data, e.g. a data from an on-board sensor, of the vehicle. If the data transfer rate does not meet a certain criterion, e.g. it drops below a threshold, then the controlling apparatus sends commands to the vehicle such as commands to stop or slow down the vehicle. Again, the controller may send a message to the vehicle with a priority list for the sensors requesting the vehicle to send on-board sensor's data according to the indicated priority list.

US 2018/365909 describes several solutions for sharing information about sensors in a vehicle. A wireless communication apparatus generates a request for information of a sensor of a vehicle and transmits it to the vehicle via a communication channel. The request is generated based on at least one capability of the vehicle's sensor, which may be received by the apparatus via a vehicle information message. The request may be transmitted directly to a specific vehicle whose identifier is included in the vehicle information message, or it may be transmitted to multiple vehicles to request, from any one meeting the criteria specified in the request, to share the information of the sensor specified in the request. In this solution, each vehicle or apparatus directly accesses only its sensors, and decides to share data only after receiving a request from another apparatus, if that request meets certain conditions.

US 2019/130754 discloses a device for sharing data from a vehicle sensor. The device comprises one or more processors configured to receive sensor information representing sensor data generated by one or more sensors of a first vehicle; to determine a reliability indicator indicating the reliability of the received sensor information; to determine from the received sensor information a criticality indicator indicating the criticality of the received sensor information for the first vehicle; to select a data sharing level based on the criticality indicator and the reliability indicator; and to generate a message comprising observation information or a request for observation information, wherein the observation information corresponds to the sensor information according to the data sharing level. US 2019/130754 also describes a communication protocol for sharing information among vehicles, wherein a vehicle sends a request to access sensor data or sends a sensor data availability message. The offer or data request message can be sent to a single vehicle (unicast) or to multiple vehicles (multicast) or to all vehicles (broadcast). The vehicles receiving the message decide whether or not to accept the request or the offer received.

SUMMARY

An object of the present invention is to overcome the disadvantages of the prior art.

In particular, it is an object of the present invention to enable an efficient exchange of sensor data between at least two agents, wherein at least one agent is a vehicle. For example, a data exchange between one vehicle and another vehicle or an aerial sensing system (such as surveillance drones) or a fixed agent with vision sensors, e.g., one or more cameras, positioned on a building, on a traffic light, or a network station, or co-located with a road surveillance system.

These and other objects of the present invention are achieved by means of a system and a method incorporating the features of the accompanying claims, which form an integral part of the present description.

According to a first aspect, the present invention is directed to a method of communication between two agents, at least one of which is a mobile vehicle, wherein a first agent communicates with a second agent comprising a sensor, wherein the second agent sends to the first agent, via a radio link, features and control parameters of the sensor necessary to directly query the sensor of the second agent. The first agent uses the control parameters to request, from the sensor of the second agent, data produced by the sensor selected according to a selection criterion dependent on said features of the sensor, and the second agent sends the requested data.

This solution allows to improve the environmental perception of a vehicle agent, which can access data of external sensors, optimizing the effectiveness of the on-board fusion. In fact, a virtual bus is created between vehicle agent and second agent that allows the vehicle agent to request only the data produced by the second agent's sensor that it needs.

In particular, the control parameters include at least one virtual address of the sensor. The first agent requests the selected sensor's data by sending the request through the radio link and using the virtual address. The second agent receives the request of the first agent via a virtual reception port associated to the sensor. The virtual reception port sends a forwarded request on a local communication bus to which the sensor is connected. The sensor receives the forwarded request and, in response to the forwarded request, sends sensor data to a virtual transmission port. An encoder of the second agent receives data from the sensor via the virtual transmission port, encodes and sends to the first agent the sensor data specified in the request sent by the first agent.

In one embodiment, the first agent activates a virtual communication bus with the second agent. The activation of the communication bus comprises assigning a respective virtual address to the sensor included in the second agent and creating a virtual transmission port associated with the sensor of the second agent in the first agent and in the second agent.

The exchange of data from the sensors from an agent preferably takes place without any processing adapted to extract the information contained therein. In particular, the data produced by the queried sensor is sent to the agent requesting them without further processing than those necessary for radio communication, such as for example compression and/or fragmentation in order to reduce the data-rate.

Advantageously, the second agent measures the quality of the radio link with the first agent and, according to the measured quality, adjusts the data rate and/or the fragmentation with which the data are transmitted and/or the transmission priority thereof. This is particularly advantageous when the radio link uses high frequencies, in the order of ten GHz and above, which are very susceptible to interferences and can break down suddenly. In these situations, a proper evaluation of the quality of the channel to request an amount of data that can be transmitted before the radio communication drops becomes very important.

According to another aspect, the invention is directed to one of the agents implementing the method disclosed above and further described below. In particular, the invention is directed to an agent comprising a processing and control unit configured to control the operation of the agent, and a radio communication unit operatively connected to the processing and control unit and adapted to establish a radio link with a second agent equipped with at least one sensor. The radio communication unit is configured to receive from the agent, via the radio link, features of the sensor and control parameters necessary to query the sensor, and to transmit the features of the sensor and the received control parameters to the processing and control unit. The processing and control unit is configured to use the control parameters of the sensor to send a request to the sensor for data selected according to a selection criterion dependent on the features of the sensor.

According to a further aspect, the invention is directed to a vehicle agent preferably comprising at least one local sensor, for example a local environmental sensor adapted to acquire data of an environment surrounding the vehicle and/or a local position sensor adapted to provide a position of the vehicle and/or a telemetry sensor adapted to provide telemetry data of the vehicle. A processing and control unit is operatively connected to the sensor to receive therefrom data to control the vehicle. The vehicle agent further comprises a radio communication unit operatively connected to the processing and control unit and adapted to establish a radio link with a second agent equipped with at least a second sensor. The radio communication unit is configured to receive from the second agent the features of the second sensor and control parameters necessary to query the second sensor. The same communication unit of the first agent is then configured to transmit the received control parameters to the processing and control unit. The processing and control unit is configured to use the control parameters to request from the second sensor data selected according to a selection criterion dependent on the features of the second sensor.

According to a further aspect, the invention is directed to a stationary agent, in particular an apparatus for accessing a telecommunications network, for example a base station of a 4G, 5G network. The agent comprises a processing and control unit configured to control the operation of the agent, and a radio communication unit operatively connected to the processing and control unit and adapted to establish a radio link with a second agent equipped with at least one sensor. The access apparatus is configured to receive from a remote control centre—for example, via the internet—a query request from the second agent, to request the control parameters and features of the sensor of the second agent from the second agent via said radio link. The radio communication unit is configured to receive from the agent, via the radio link, the requested information and to transmit it to the processing and control unit. The processing and control unit is configured to use the control parameters of the second sensor to send to the second sensor a request for data selected on the basis of a selection criterion dependent on said features of the second sensor. The access apparatus is then configured to transmit the received data of the second sensor via the radio communication unit to the remote control centre.

According to a further aspect, the invention is directed to an agent comprising a sensor. A radio communication unit is adapted to establish a radio link with a second agent and is configured to transmit the features of the sensor and control parameters necessary to query the sensor to the second agent in order to transmit the data produced by the sensor. The radio communication unit receives a request from the second agent for data produced by the sensor, and transmits this request for data produced by the sensor to the appropriately addressed sensor. As explained above, the data produced by the sensor are compressed and/or fragmented.

According to a further aspect, the invention is directed to a communication system between two agents one of which is a vehicle and the other of which is a vehicle or a network station, or a road surveillance device, such as a traffic light, as set forth above and as further described in the following description.

Further features and advantages of the present invention will be more apparent from the description of the accompanying drawings.

BRIEF DESCRIPTION OF THE DRAWINGS

The invention will be described below with reference to some examples, provided for explanatory and non-limiting purposes, and illustrated in the accompanying drawings.

These drawings illustrate different aspects and embodiments of the present invention and, where appropriate, reference numerals illustrating similar structures, components, materials and/or elements in different figures are indicated by similar reference numbers.

FIG. 2 illustrates a first step of connection between two vehicles capable of communication according to the present invention.

FIG. 3 illustrates the creation of a virtual bus between the two vehicles of FIG. 2.

DETAILED DESCRIPTION OF THE EMBODIMENTS

Figure 1:
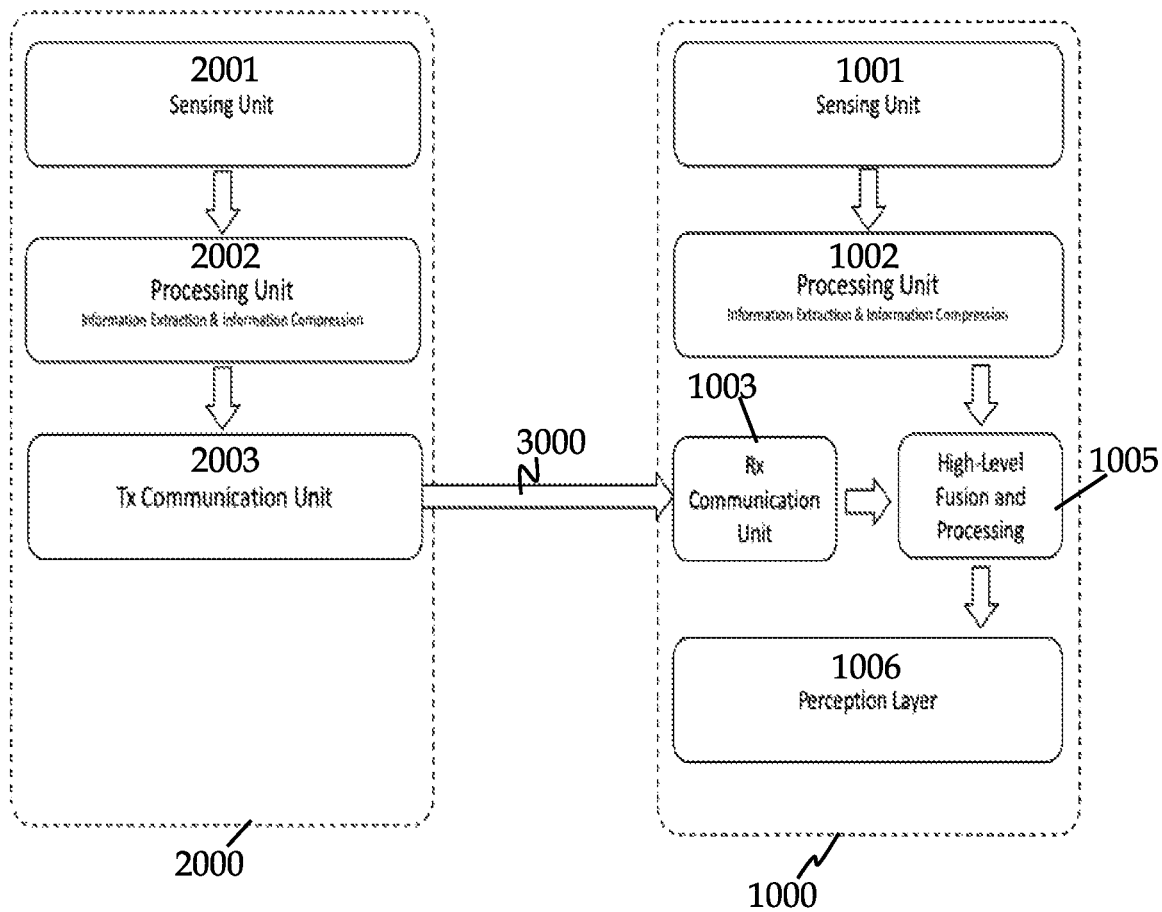
FIG. 1 illustrates a cooperative communication system among vehicles according to the prior art.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise stated.

In this description, the term agent is used to identify an entity—software and/or hardware—capable of exchanging data via a radio communication system.

With reference to the following figures, a system for increasing the vehicle detection capabilities is illustrated, namely an Extended Perception (EP) system in which on-board sensors of a vehicle are transformed into "virtual sensors" accessible to nearby vehicles.

Two agents represented by two vehicles are considered in FIG. 2. The two vehicles, A and B, are each equipped with a sensing unit, denoted with 100 and 100'. In this embodiment, the sensing unit 100 of the vehicle A comprises a radar 110, a camera 111, and a LIDAR 112 (not shown in FIG. 2). Equally, the sensing unit 100' of the vehicle B comprises a radar 110' (not shown in FIG. 2), a camera 111' and a LIDAR 112'. The type and number of sensors in each vehicle may vary from vehicle to vehicle and is not limiting to the present invention.

Each sensor of the sensing unit is identified in its vehicle with a label and an address (for example, an IP address), which are parameters by which it can be queried by the respective vehicle's Processing and Control Unit (PCU) 500 via an internal communication bus 400.

Each vehicle A and B is then equipped with a communication unit 200 capable of establishing a direct radio link with the communication unit of the other vehicle.

Preferably, the communication unit 200 is capable of using a high data-rate communication including those known in the art as UHDLL (Ultra-High Data Low-Latency Link). In general, for the purposes of this description "high data-rate" means a communication with a data rate of at least 100 Mbps or preferably at least 200 Mbps.

FIG. 2 schematically illustrates a situation wherein vehicle A and vehicle B are in the condition of establishing a direct communication. Such a condition may be generated, for example, in the case in which the vehicle A responds to a broadcast signal sent by vehicle B to indicate its presence and/or the search for vehicles or, in general, external devices equipped with environmental sensors, such as, for example, intelligent traffic lights, road cameras, etc.

Once the vehicle B receives the response of A to the broadcast signal, the two vehicles—in particular, as explained below, the respective communication units 200—begin the exchange of radio messages necessary to establish a radio link between the two vehicles and allow the realization of a virtual bus, illustrated in FIG. 3, by means of which a vehicle, B in this case, can access one or more sensors of the sensing unit 100 of the vehicle A, so as to query them to request the data produced by the sensor selected according to a criterion that makes them necessary to it, for example to detect objects in the environment surrounding it. As better described below, after establishing the direct link, each vehicle transmits to the other at least one initialization message containing the features of its sensors and parameters necessary to allow the other vehicle to access its sensors, such that one vehicle can send commands directly to the sensors of the other vehicle, as if the sensors of the other vehicle were additional on-board sensors. If data produced by environmental sensors, such as a LIDAR or a camera, are sent, the result is a virtualization of the sensors that increases the capability to perceive the context, for example by allowing a vehicle to access the images, unprocessed except by compression, coding and/or segmentation, of all vehicles with which a virtual bus has been created.

Figure 4:
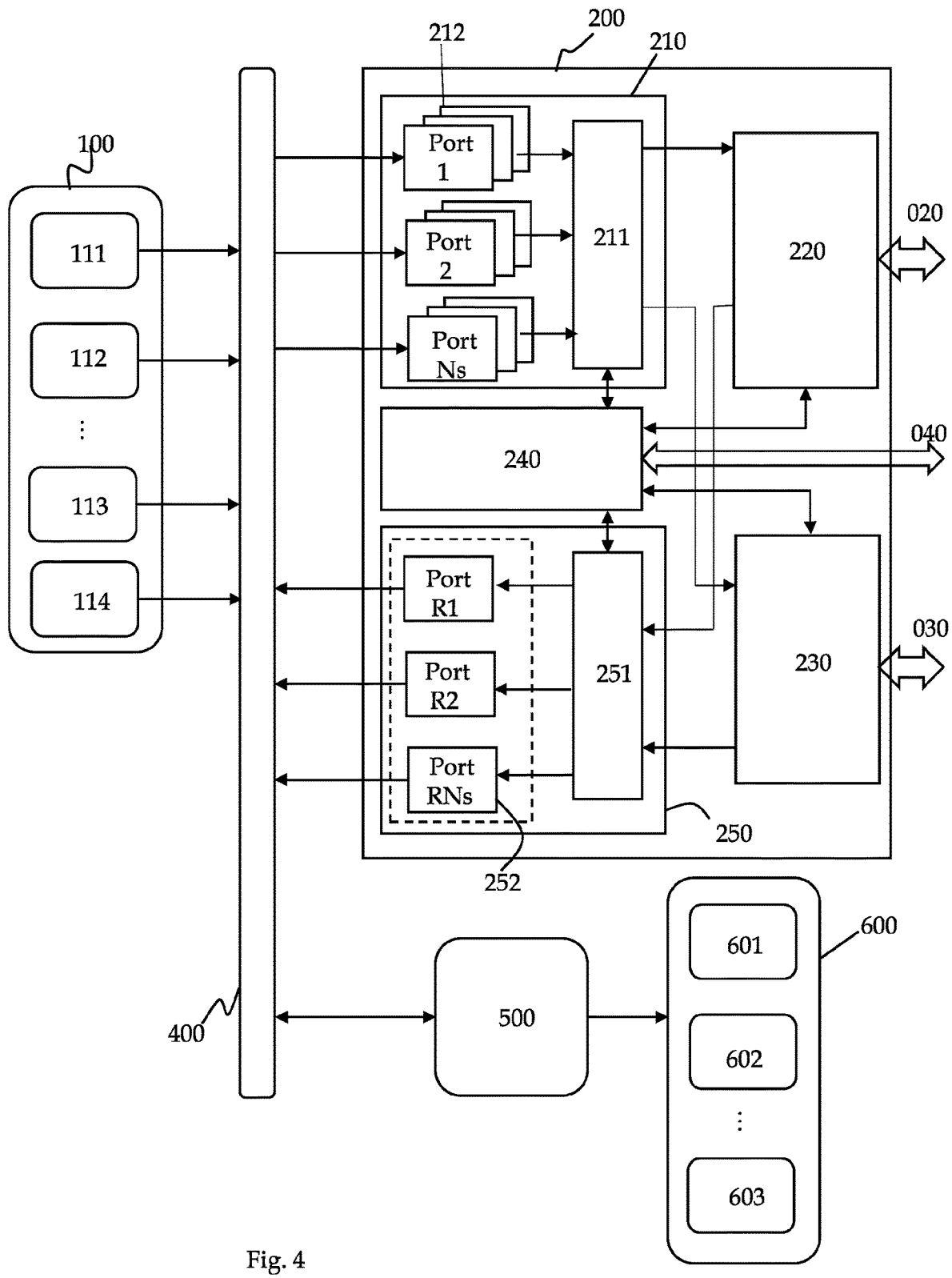
FIG. 4 is a block diagram of the vehicles of FIGS. 2 and 3.

FIG. 4, shows a block diagram of some components of a mobile agent, in particular a vehicle, according to a first embodiment of the present invention. Other components, not essential to the present invention, are not described herein, but may be clearly present in the vehicle.

Figure 5:
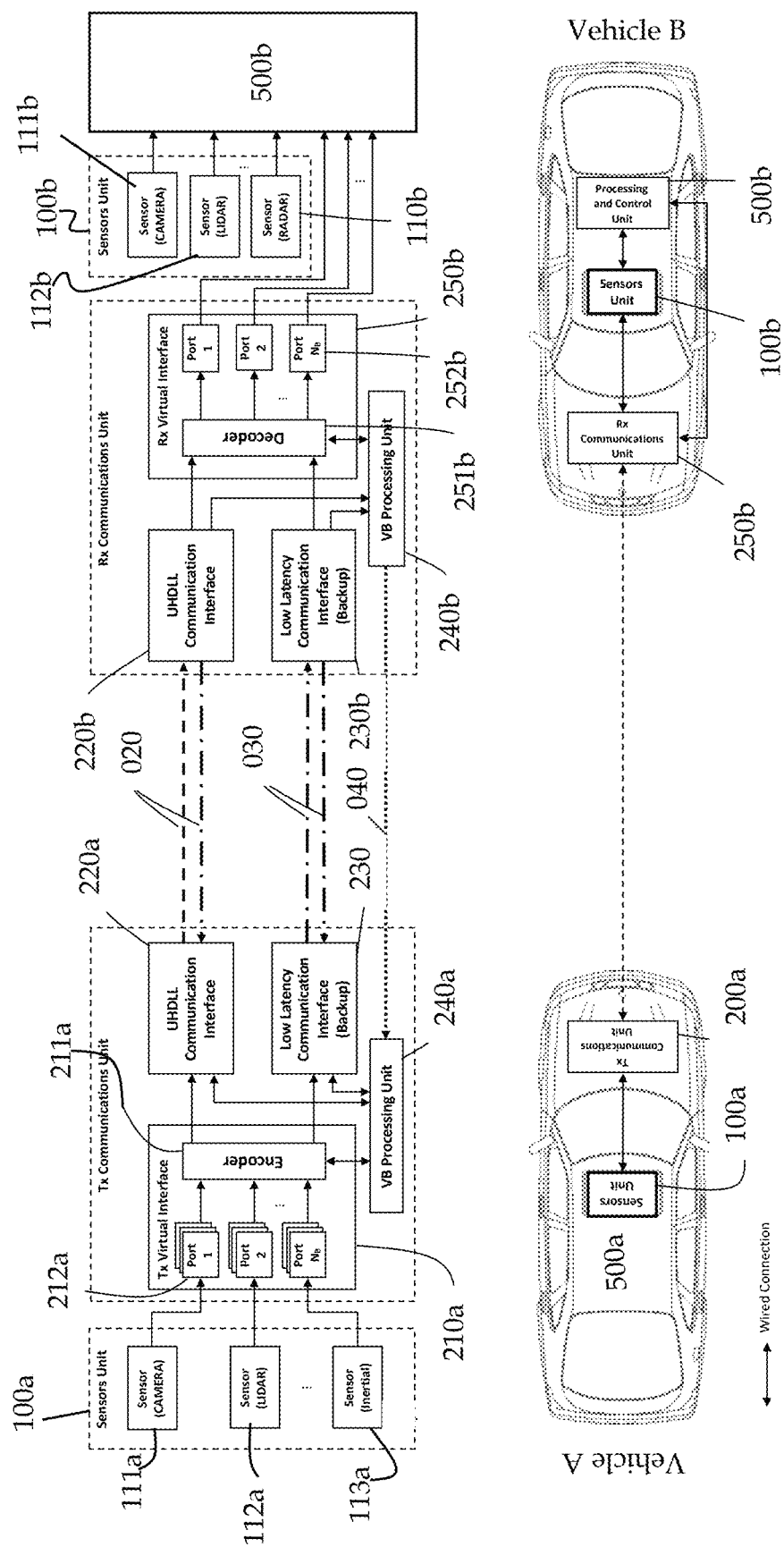
FIG. 5 illustrates the components in FIG. 4 involved in transferring data from one vehicle of FIG. 2 to an the other one.

The same components are illustrated in FIG. 5 where a communication between two agents is schematized, in detail a situation where a mobile agent—vehicle B—transmits data to a second mobile agent, vehicle A.

In the example of FIG. 4, the agent comprises a sensing unit 100 comprising a plurality of sensors, including environmental sensors, position sensors, and on-board installed telemetry sensors. The environmental sensors are adapted to detect data from the environment surrounding the mobile agent and comprise, for example, remote sensing devices such as Radar, camera and Lidar. The position sensors are adapted to detect data related to the position and/or speed of the vehicle and may comprise, for example, an inertial measurement unit (IMU), a multi-axis accelerometer, a gyroscope, an odometer, a localisation unit (e.g. of the Global Navigation Systems type such as Global Positioning System and/or Galileo). The telemetric sensors are adapted to detect mechanical and electronic parameters inherent in the conduct of the mobile agent. It is clear that in the case of fixed agents, such as traffic lights or road cameras, some of the sensors described above may not be present, for example telemetry sensors may be omitted. Shown in the example of FIG. 4 are a camera 111, a LIDAR 112, an inertial measurement unit 113, and a telemetry sensor 114.

The sensing unit 100 is connected, via a communication bus 400 internal to the mobile agent, to the processing and control unit 500. The communication bus 400 may be an Ethernet, serial, parallel or other type of bus.

The processing and control unit 500 comprises all hardware and software for processing information received from the local sensors of the sensing unit 100 and for fusing it with information received from the sensors of the other agent. Therefore, the processing and control unit 500 is configured to process data received from the sensors (local ones or from other vehicles), to detect the presence of objects and/or persons in the environment surrounding the mobile agent, and to control actuators 600, such as steering 601, brakes 602, and accelerator 603, in order to avoid objects and people that are in its trajectory and/or to activate audible and/or visual alarms to signal warning situations for the driver of the vehicle. The processing and control unit 500 is then configured to perform trajectory control and planning, to implement object prediction, and many other functionalities inherent in actuators of autonomous vehicle.

The mobile agent then comprises a communication unit 200 comprising a UHDLL communication interface 220 capable of enabling a communication with ultra-high and low latency data rates (at most 10 ms, but preferably 5 ms or less), using high-frequency bands, typically above 6 GHz, for example in the range 24-28 GHz, or 37-42 GHz, or 76-80 GHz, or 120 GHz-140 GHz.

Preferably, the vehicle also comprises a low latency (LL) communication interface 230, which allows the communication at operating frequencies and transmission rates lower than the UHDLL communication interface. For example, the interface 230 is adapted to enable a DSRC communication (e.g., according to the 802.11p standard) or a Cellular Vehicle to Everything (C-V2X) communication operating at frequencies below 6 GHz.

For the management of the two UHDLL and LL communication interfaces, which use two different frequencies, the concept of carrier aggregation is preferably used and described in the document 3GPP TS138.101 v.15.2.0 related to the 5G NR system, in which there is inter-band carrier aggregation between the FR1 frequencies (450 MHz-6 GHz) which in this case is the LL communication interface, and the FR2 frequencies (24.25 GHz-52.GHz) which are the frequencies for the UHDLL communication interface.

The communication unit 200 further comprises a transmission unit 210 and a reception unit 250 operatively connected to the communication interfaces UHDLL 220 and LL 230.

The transmission unit 210 in turn comprises an encoding apparatus (encoder) 211 configured to compress and possibly segment the data received from the sensors (111-113) via a respective virtual transmission port 212. Preferably, the encoder is configured to vary the data compression based on the reliability, stability and continuity of the radio link that the communication interfaces 220 and/or 230 have in place with other external devices. The encoder takes the sensor data via the virtual port, encodes them, depending on the quality of the radio channel, into frames and packages suitable for the communication interfaces 220 and 230, possibly organizing the data according to a priority list of the sensors.

The encoder 211 receives data from the sensors via the virtual transmission ports 212. In the example of FIG. 4, each virtual port is configured to allow access to data of a respective sensor, however according to other embodiments a sensor (100) may connect to multiple virtual ports. Advantageously, the virtual ports are configured to allow access to the data produced by the sensor even in the case of multiple requests, e.g., requests originating from a plurality of external agents.

In case multiple external agents request different data produced by the same local sensor of the agent, for example multiple agents request different portions of an image taken by a camera, the virtual port 212 allocates for each request a respective memory area where to temporarily store the response data sent by the sensor—in the example the camera—to the respective request. The virtual port 212 transfers to the encoder, upon the encoder's request, the data that must be transmitted to the external agents to respond to each data request received from the external agents.

In one embodiment the virtual transmission port 212 may be a dual-port memory that duplicates the data of each sensor for the access by the encoder, however according to other embodiments the port 212 may be realised by software configuration.

A virtual bus processing unit 240 is operatively connected to the encoder 211 and to the communication interfaces 220 and 230. The virtual bus processing unit 240 controls the status and the quality of the radio link (020 and/or 030) with all the other agents based on feedback messages received from the communication interfaces 220 and 230. Depending on the feedback received from these interfaces, the virtual bus processing unit adapts the encoding capability of the encoder 211 and controls the communication interfaces to send to a respective decoding apparatus (decoder), of each of the agents receiving the data produced by the sensor, a message, distinct for each of the agents, indicating the information necessary for decoding.

The virtual bus processing unit 240 is then configured to connect to the virtual bus processing unit of other agents via the communication interfaces (220 and/or 230), so as to create a virtual control connection (040) with the other virtual bus processing unit.

Finally, the communication unit 200 comprises a reception unit 250 comprising a decoding apparatus (decoder) 251 that decodes the data received in frames from the communication interface 220 or 230 by extracting data produced by the sensors of the queried agent(s) and supplying them to the processing and control unit 500, for example through a virtual reception port 252 that interfaces the decoder to the internal communication bus 400. In the example of FIG. 4, the virtual reception port 252 is a component that creates a virtual port (R1, R2 . . . RNs) for each data stream related to a request made by the processing and control unit 500 to a sensor of another vehicle or road surveillance device.

Encoder 211 and decoder 251 thus make the communication channel transparent, so the processing and control unit 500 accesses data produced by the internal sensors and data produced by the sensors of external agents received via the radio communication channel.

Figure 6:
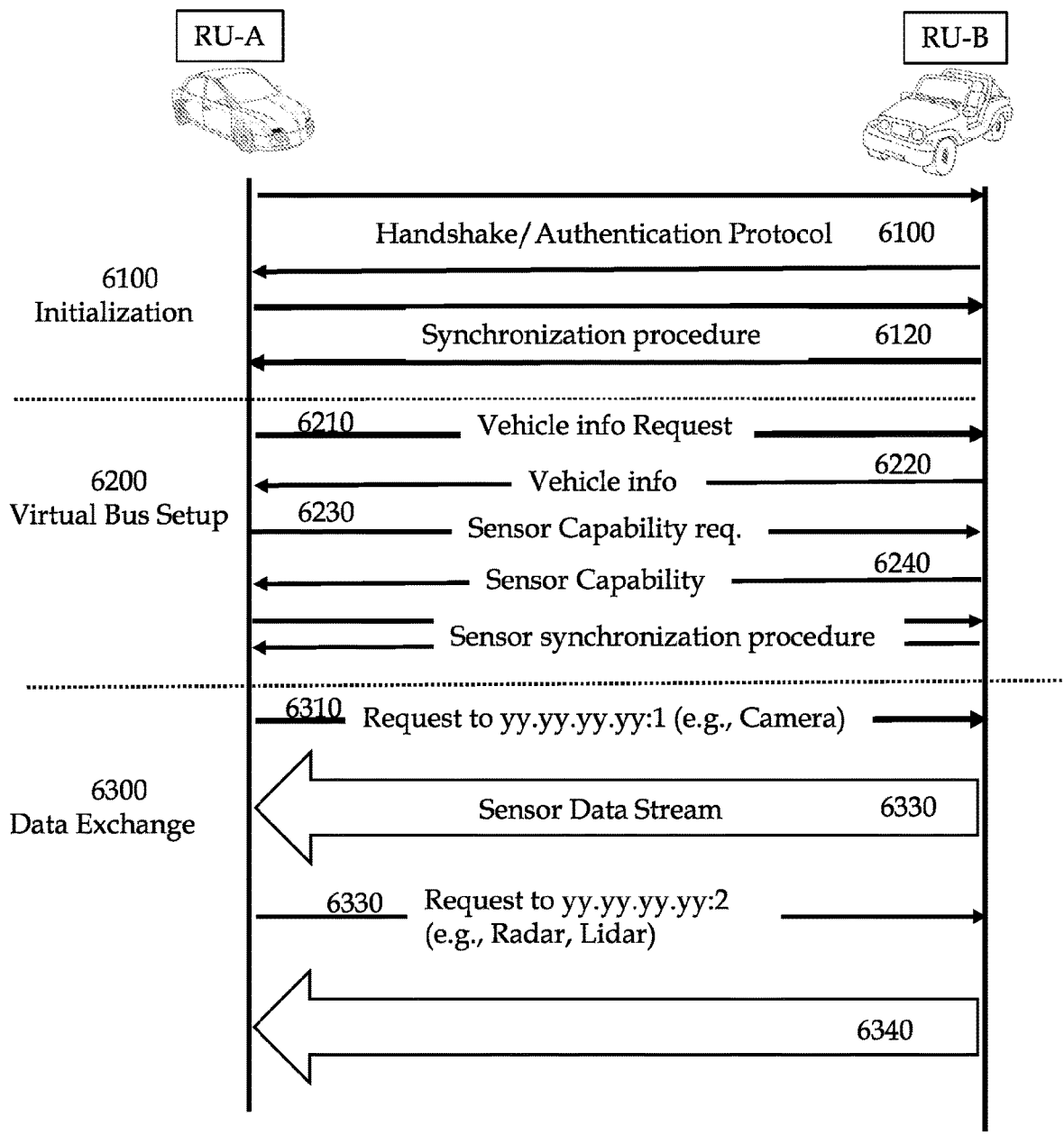
FIG. 6 illustrates the steps of the method of direct communication among the vehicles of FIG. 2.

With reference to FIGS. 5 and 6, the method of communication between two vehicles of the type described above is now illustrated with reference to FIG. 4. For clarity's sake, where necessary the components in FIG. 4 are indicated by adding the letter "a" for the vehicle A and by adding the letter "b" for the vehicle B. When a vehicle A detects the presence of a vehicle B equipped with sensors, the virtual bus processing units 240 implement a first initialization step (6100) comprising, in a per se known manner, a first "handshake" and authentication (6110) that allows the bus processing unit of a vehicle to learn about and contact the processing unit of the other vehicle. In the example of FIG. 6, there is also provided a synchronization step (6120) of the two vehicles, for example by synchronization of respective clock signals. In order to implement this step, each processing unit of the virtual bus 240 generates appropriate data packages to be transmitted which are passed to the respective encoder 211 with an indication of the communication interface to be used for the radio connection and any settings of the same communication interface. The transmitted data packages are received via communication interface 220 or 230, decoded by the decoder 251, and passed to the virtual bus processing unit 240.

Next, the communication method includes a step 6200 of setting up (Set-Up) the virtual bus. With reference to the example in FIG. 6, in this step the virtual bus processing unit 240*a* of the vehicle A requests (6210) information about vehicle B by sending a vehicle information request message with which the vehicle A checks the availability/capability of vehicle B to establish a virtual bus for exchanging the data produced by the sensors.

The virtual bus processing unit 240*b* of vehicle B responds by accepting or not accepting the negotiation for establishing a virtual bus and by optionally sending a Vehicle Characterisation Table—shown below in Table 1—which contains miscellaneous information including vehicle type, and mechanical and dynamic information about the vehicle, for example: the position (expressed as latitude, longitude and altitude), the direction and speed of the vehicle, the dimensions of the vehicle, inertial and dynamic parameters of the position of the centre of gravity with respect to the chassis or the wheels (for the reference of the position of the sensors on the vehicle), the expected trajectory and its quality (for autonomous vehicles), as illustrated below:

TABLE 1

| Position (Lat, Lon, Alt) | Direction and speed | Dimensions (W, L, H) | Inertial and dynamic parameters | Trajectory Expected | Trajectory quality |
|---|---|---|---|---|---|
| xxx, xxx, xxx | xxx, xxx . . . | xx, xx, xx | xxx, xxx, xxx | xxx, xxx . . . | xxxx |

According to embodiments different from the one in FIG. 6, the vehicle A may avoid sending the request for information about vehicle B (step 6210). In these embodiments, the vehicle A retrieves the information in Table 1 from a third agent, such as a network base station or an intelligent traffic light, or it may be estimated by the requesting vehicle or in collaboration with other agents on the road. Again, such information could be retrieved from the vehicle by accessing an internal or remote database. In addition, a measure of the quality of each piece of information included in Table 1 can be obtained. Quality is a measure that represents the accuracy of information.

Next, step 6230, the virtual bus processing unit 240*a* of vehicle A sends a message in which the capability of the sensors of vehicle B is requested. The virtual bus processing unit 240*b* of vehicle B responds (step 6240) to this message by sending a table of the sensing capabilities of the type illustrated below:

TABLE 2

| Sensor ID | Sensor Type | Address (local bus) | Address (virtual bus) | Virtual bus availability | Sensor data encoding | Sensor positioning, targeting, coverage | Sensor quality |
|---|---|---|---|---|---|---|---|
| SU1 | xxx | xx.xx.xx:1 | yy.yy.yy:1 | 0/1 | xxxx | Coord (x, y, x) Angle (x, y, z) Coverage | List of parameters |
| SU2 | | | | | | | |
| . . . | | | | | | | |

Table 2 contains the list of all the sensors (environmental, position and telemetric) available on board, together with information and control parameters necessary to manage them, such as:
- the type of sensor, e.g. camera or radar or LIDAR or IMU;
- the address of the sensor within the local bus of the vehicle, this address could for example be an IP address;
- the address of the sensor within the virtual bus, or with reference to the example in FIG. 4, the address of the instances of the virtual ports 212. These addresses could also be IP addresses;
- a flag indicating the availability of the sensor to be visible from other vehicles and/or external devices,
- the encoding of the sensor devices (typically the devices of the sensor (110) and/or of the Encoder (211), to exemplify H264/MPEG-4 AVC video encoding),
- the position of the sensor on the vehicle (e.g. in relation to the centre of gravity), its heading angles and coverage (e.g. camera opening),
- the sensor quality parameters, which indicate the quality of the data detected (e.g. pixel granularity)

Other information such as the serial number of the sensor, the manufacturer, the model, etc., can also be entered in Table 2. In the case of video sensors, Table 2 may comprise control parameters necessary to query the sensor, such as for example the available frame rate and the scalability, the granularity of data segmentation (e.g., an image is extractable in multiple blocks of 64×64), colour/black and white). For radar sensors, the control parameters may comprise the type of radar, the waveform used, whether or not the Doppler is evaluated, whether it measures coherent (SAR type) or incoherent imaging, whether MIMO radar and thus how much the resolution of the MIMO radar with virtual array is, etc. . . . .

For simplicity's sake, in the example of FIG. 6 the vehicle A is the only one that requests and obtains Tables 1 and 2 from vehicle B, however in a preferred embodiment, these two tables are also sent from vehicle A to vehicle B in response to requests similar to those described above with reference to vehicle A.

Preferably, then, downstream of the exchange of tables 1 and 2, the two vehicles each perform an evaluation on the usefulness of activating the virtual bus with the other vehicle. For example, if the vehicle B has cameras geared to film an area already covered by the vehicle A, then the vehicle A may have no interest in establishing the virtual bus with the vehicle B. If the opportunity evaluation is negative, then the vehicle that initiated the virtual bus establishment procedure may decide to discontinue it. If, on the contrary, the opportunity evaluation is positive, the communication method resumes as described below with reference to the example of FIG. 6, where the aforesaid opportunity evaluation is not provided for. The initialization step then ends with a sensor synchronization procedure (6250) that identifies the establishment of a virtual bus between A and B and in which the time bases (clocks) and sampling frequencies of the different sensors are aligned in order to time the requests for access to the data produced by a specific sensor of the other vehicle.

Once the initialization step is complete, the step 6300 of actual data exchange begins. In the example considered herein, the processing and control unit 500*a* of the vehicle A requests data from the sensor SU1 of the vehicle B (in this case a camera) by sending a data request on the local bus 400*a* to the virtual address of the sensor SU1, i.e. yy.yy.yy:1. The request message is received by the virtual transmission port 212*a* associated with the virtual sensor, and from there passed to the encoder 211*a* which transmits it via the communication interface indicated by the virtual bus processing unit 240*a*. In the example considered herein of FIG. 6, the data request messages (6310, 6330) as well as the messages exchanged for the initialization step 6100 and the virtual bus set-up step 6200 are sent via the LL interface 230a, while the data of the sensors (6320, 6340) are exchanged via the UHDLL interface 220a. However, if the bandwidth availability permits it, it is possible to transmit all or most of the messages, including those of the initialization and set-up step of the virtual bus, via the 020 UHDLL channel. The type of interface used for message exchange may change based on the conditions.

The data request to the sensor of virtual address yy.yy.yy:1 is received by the vehicle B through the communication interface, in this case 230b, and supplied to the decoder 251b which decodes it and transmits it on the local bus 400b to the address xx.xx.xx:1 through the port 252b, associated with the sensor SU1, which is responsible for converting the address from that of the virtual bus to that of the local bus.

At this point, the sensor SU1 of the vehicle B receives the request and transmits to the virtual port 212b the data produced by the sensor and sends them to the local bus 400b. The data are received by the virtual port 212b dedicated to the sensor SU1 and processed by the encoder 211b of the vehicle B which provides to transmit the requested data to the vehicle A through the interface UHDLL 220b, where the decoder 251a provides to decode them and transmit them on the local bus 400a by sending them to the address of the PCU 500a of vehicle A.

Thanks to the information in Tables 1 and 2 received from the vehicle B, the PCU 500a of vehicle A may request a subset of the data that a sensor of the vehicle B could transmit. For example, if the vehicle B is equipped with a camera having a horizontal filming angle of 120° and a vertical filming angle of 30°, based on the position and orientation of the vehicle B, the vehicle A can only request the data related to a particular filming angle, for example horizontally between 10° and 30° and vertically between 2° and 20°, where the vehicle A knows—thanks to its local sensors or the data received from other agents—that a person or an object of interest is present.

Despite this expedient, the amount of data to be transmitted by the sensor of the vehicle B may be very large, as may be the amount of data that the vehicle A must also receive from other vehicles or agents. Both the encoder 211 and the virtual bus processing unit 240 are therefore preferably configured to implement channel management strategies.

The encoder 211 (and reciprocally the decoder 251) is configured to adapt the data rate based on commands received from the processing unit of the virtual bus 240. These commands are the result of the quality variation of the radio channel with which it is being transmitted, e.g. UHDLL channel 020. In general, the encoder will be able to follow different strategies of fragmentation and prioritization of the data produced by the sensor that can be used to decide the order with which to transmit the data on the radio channel.

For example, in the case of video data, such as for example data acquired by a camera, the encoder may use a first object fragmentation strategy, where moving objects are detected in the video frames and are assigned to a priority level based on the speed of the object, e.g., a person crossing the street will have a higher priority than a—fixed-traffic light but a lower priority than a car travelling at high speed. Therefore, the portion of video data related to the moving object will have a high priority and will be sent first to overcome the quality loss in radio link over time.

A second possible compression strategy of the data produced by the camera sensor and adoptable by the encoder is a differential fragmentation strategy. According to this second strategy, the encoder calculates the difference between successive frames and assigns a higher priority to the portions of the frames with a higher difference. The encoder, therefore, will transmit the frame starting from the frame portions with a higher difference and gradually transmitting those with a lower priority.

A further example of strategy that can be implemented by the encoder on video images is a fixed fragmentation strategy. According to this strategy, the encoder divides the frame into areas and assigns a priority level to each of them. The division can be based on a grid, a circle, or any geometric configuration.

As much as the above strategy examples have been referred to video images acquired by a camera, the same fragmentation strategies can be used in a similar way for data acquired by other environmental sensors—such as radar, lidar, etc. . . . —or by positioning sensors—such as inertial units, gyroscopes, odometers, positioning sensors—and telemetry sensors.

Figure 7:
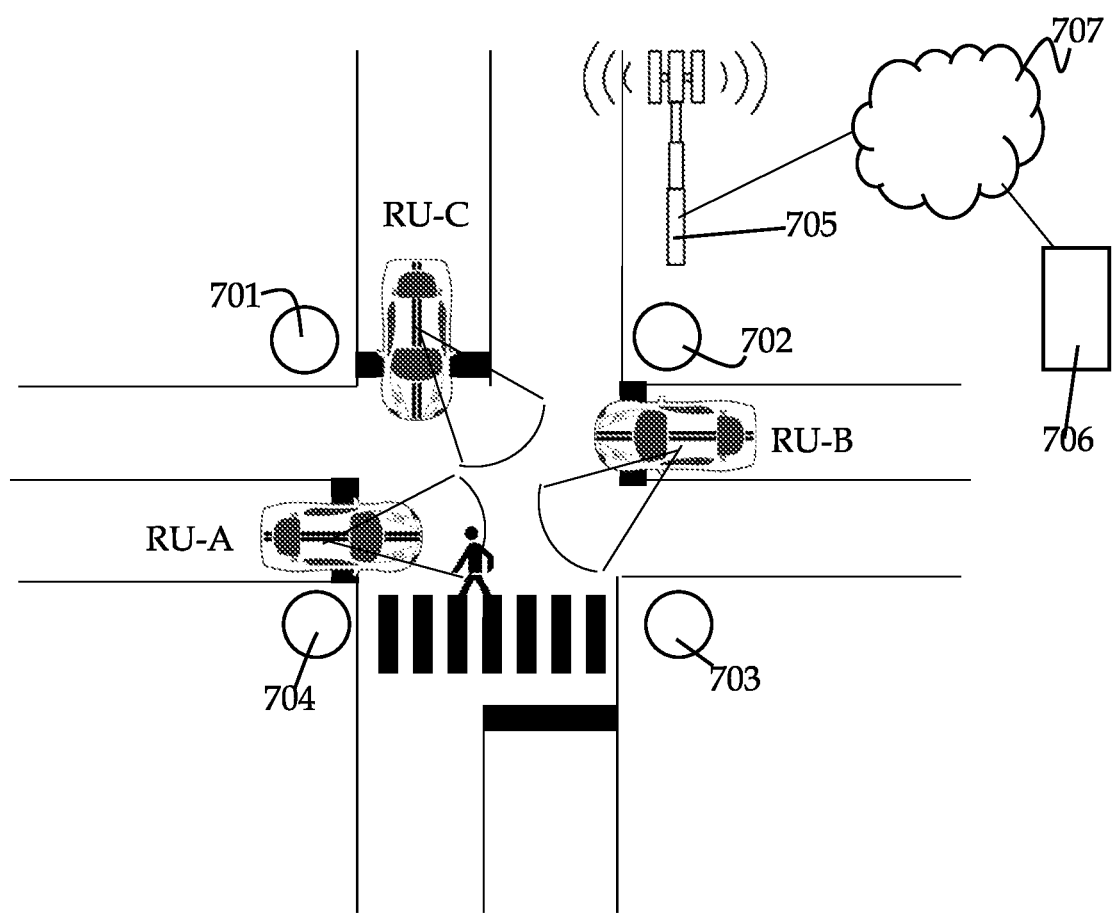
FIG. 7 illustrates a city scenario where three vehicles are at an intersection.

In order to better understand the operation of the Enhanced Perception system, reference is now made to the example in FIG. 7, where three vehicles (RU-A, RU-B and RU-C) are at an intersection where there are also traffic lights (701-704) equipped with cameras filming the intersection. Each traffic light is therefore a fixed agent equipped with a sensing unit 100 (in this example comprising a camera) and with a communication unit 200 such as vehicles, and is therefore able to create a virtual bus with the vehicles and make directly accessible—possibly compressed and/or fragmented—the data acquired by the camera. In the vicinity of the intersection, there is also a base station 705—also a fixed agent—of a cellular network, e.g., a base station of a 3G network or a B-node of a 4G or 5G network or later. As explained below, the base station 705 allows, in some embodiments, to connect two vehicles or a vehicle and a road surveillance device, which are not in line of sight (LoS).

The virtual bus processing units 240 of each vehicle receive signals indicating the presence of the other vehicles and fixed road surveillance agents, and, as described above, initialize a virtual bus with some or each of them. To clarify, the vehicle RU-A creates a virtual bus with the vehicles RU-B and RU-C and virtual buses with the traffic lights 701, 702, 703 and 704. The connection can be a direct link among vehicles (V2V—Vehicle to Vehicle) or a direct link between vehicle and traffic light (V2I—Vehicle to Infrastructure) or an indirect link (V2N—Vehicle to Network) that uses the telecommunications network to which the base station 705 belongs in order to connect two vehicles or a vehicle and a traffic light.

In the example of FIG. 7, the vehicle RU-A detects the presence of a pedestrian crossing the zebra crossing on his right and the presence of the vehicles RU-B and RU-C. The processing and control unit 500 of the vehicle RU-A, determines that the volume of space occupied by the pedestrian is an area of particular interest and requests to the cameras of the vehicles RU-B and RU-C to transmit images of that portion of space. Likewise, the processing and control unit 500 of the vehicle RU-A may request the traffic light 703 to have images of the same portion of space. Clearly the images taken by the different cameras will offer different perspectives of the object being filmed, in this case the pedestrian. This allows the processing and control unit 500 of the vehicle RU-A to more accurately reconstruct the shape, speed and trajectory of the object, so that decisions can be made, such as, in this case, to continue straight ahead or to stop if the pre-set path requires a turn to the right.

The data request messages sent by the vehicle A are received, decoded and transmitted, via a virtual reception port 252, to the cameras connected to the local communication bus 400. The queried cameras will each transmit the requested data by sending them on the local bus to the virtual transmission ports 212 which, upon receiving the data, will pass them to the respective encoder 211.

The encoder 211 of each vehicle or traffic light encodes the data received from the port 212 according to settings that are given by the virtual bus processing unit 240, which programs how the data are to be prioritized and/or fragmented.

Programming by the virtual bus processing unit 240 is preferably dependent on the stability of the UHDLL radio link (020) which is typically scenario dependent. In the situation of FIG. 7, the vehicle A may request 5000 frames from the LIDAR of the vehicle RU-B which will be transmitted from vehicle B to vehicle A with a certain priority that depends on the context, for example if the pedestrian changes trajectory moving towards the vehicle A the virtual bus processing unit 240 of the vehicle B may increase the priority with which the frames must be transmitted from the LIDAR to the vehicle A.

Figure 8:
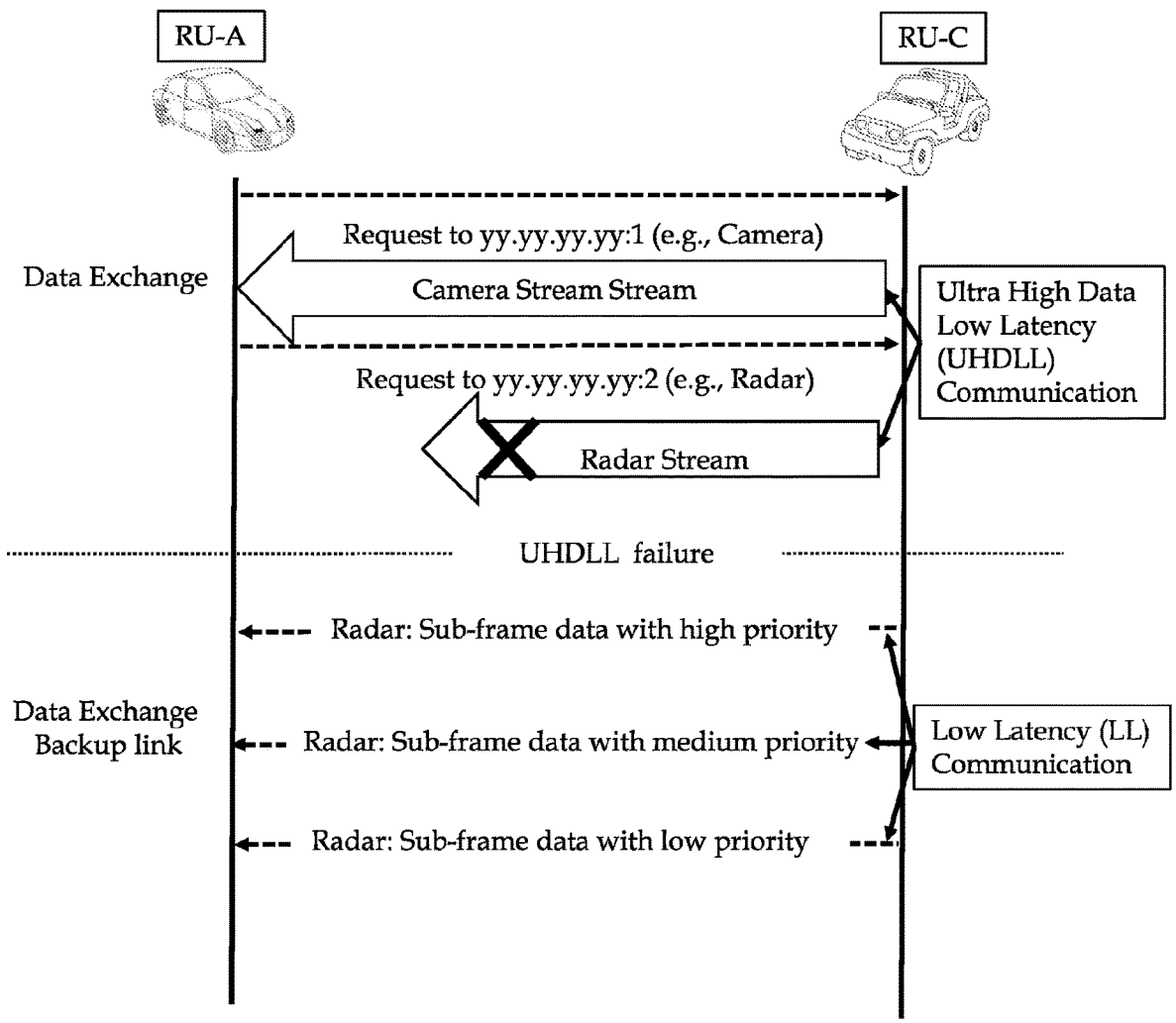
FIG. 8 illustrates the steps of the method of direct communication among the vehicles of FIG. 2 in case there is a communication interruption on the UHDLL radio channel.

The virtual bus processing units 240 of the two devices being connected, e.g., vehicle RU-A and vehicle RU-B, monitor the quality of the connection, evaluate the statistical properties and the predictability of connection interruptions, and exchange signalling messages to define the most appropriate encoding capability. For example, the data rate may be prefixed and held fixed as long as the quality of the channel 020 is higher than a prefixed threshold; if the quality of the channel 020 drops below that threshold, then the communication is switched to the backup LL link 030. Alternatively, the data rate on the channel 020 is varied in proportion to the quality of the channel 020 until the quality drops below a prefixed value, after which the communication is switched to the backup LL link 030. The transition from the communication on channel 020 to the communication on channel 030 is illustrated in FIG. 8, where the dashed line shows the communications on the channel 030 LL, and the thick arrow shows the communication on the channel 020 UHDLL.

Again, in the case of a vehicle connected with multiple external devices, such as in the above example the vehicle RU-A, the virtual bus processing unit 240 may decide whether or not to use both communication interfaces 220 and 230 or just one. For example, it may decide to receive data of the LIDAR of the vehicle RU-B via the UHDLL interface 220 and the data of the camera of the traffic lights 703 via the LL interface 230.

Without loss of generality, in the example in FIG. 7 the role of reconstruction of the scene through the virtualization of the bus transferring the data produced by the various sensors of different agents on the scene could be performed by any other mobile agent (RU-A, RU-B, RU-C) as described, or by a fixed agent (701,702,703,704) arranged to perform a fusion of the data produced by the various sensors through a system of creation of multiple virtual buses towards each of the agents (fixed and/or mobile). In one embodiment, if one or more agents had insufficient processing capacity, the creation of the virtual bus will serve another agent with sufficient processing capacity, e.g., a fixed agent, which will collect the data from the sensors of said agents and then return the processing thereof of a perceptual nature (e.g., 3D reconstruction of the scene or part thereof), via a mechanism called broadcasting to the aforesaid agents. Thus, in this case, a first agent (e.g., RU-A) sends the data request from the second sensor to a third agent (e.g., RU-C) requesting the third agent to process the data of the second sensor to detect objects in the space surrounding the first agent (e.g., RU-A). Thus, the third agent activates a virtual bus with the second agent, requests the data from the second sensor based on the request of the first agent, processes the data of the second sensor to detect objects in the space surrounding the first agent (A), and transmits the result of data processing of the second agent to the first agent (A).

In a preferred embodiment, the virtual bus processing unit 240 further decides whether the communication with other vehicles or external devices is to be by direct Line of Sight (LoS) communication or by exploiting intermediate infrastructures for indirect Non-LoS (NLoS) communication. Thus, several communication patterns are possible:

Direct Extended Perception (D-EP), in which two vehicles, e.g., RU-A and RU-B in FIG. 7, establish a vehicle-to-vehicle (V2V) communication link.

Multi-hops Extended Perception (M-EP), in which two vehicles, e.g., RU-A and RU-C in FIG. 7, establish a first vehicle-to-infrastructure (V2I) communication link and a second infrastructure-to-vehicle (I2V) communication link, e.g., using the roadside unit (RSU) that has LoS for both vehicles.

Hybrid Extended Perception (H-EP), in which both communication interfaces 220 and 230 are exploited to implement V2V and/or V2I and/or V2N connections. For example, the RU-C can communicate with the RU-A via the traffic light 701 with a LowLatency link via interface 230 and with the vehicle RU-B via UHDLL interface. All possible combinations are included in the H-EP pattern.

The direct perception pattern (D-EP) is as explained above with reference to FIG. 6.

Figure 9:
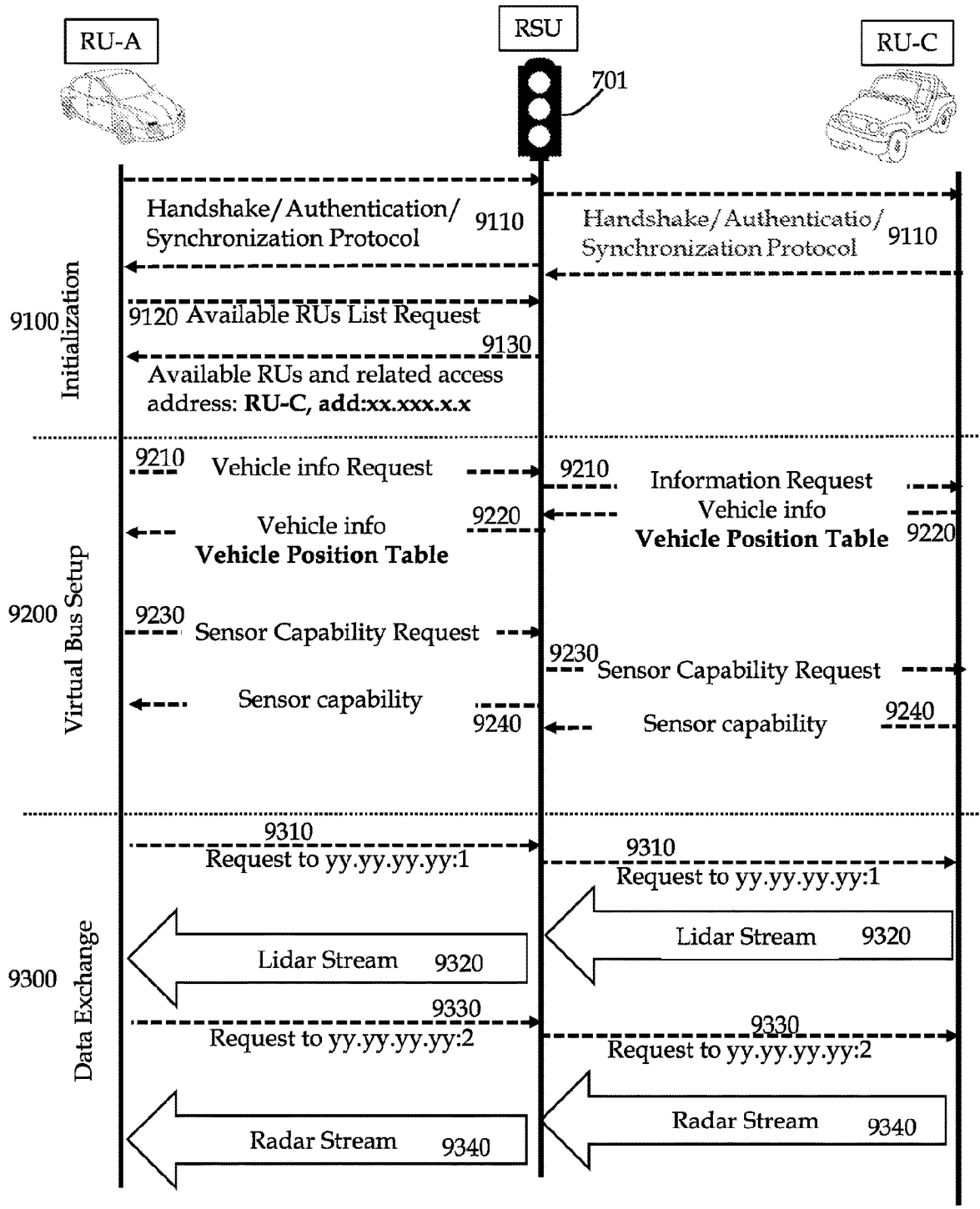
FIG. 9 illustrates a communication pattern between two vehicles involving the intermediation of a third unit.

The M-EP communication pattern is illustrated in FIG. 9, where the dashed line shows the communications on the channel 030 LL, whereas the thick arrow shows the communications on the channel 020 UHDLL. In this pattern, the communication between the vehicles RU-A and RU-B is facilitated by a fixed agent, herein indicated by a traffic light such as e.g., the traffic light 701 in FIG. 7, but could also be the base station 705 in FIG. 7. This traffic light could be replaced by other road surveillance devices, such as for example cameras, capable of creating a virtual bus according to the criteria previously set out with reference to FIG. 6. Compared to the pattern in FIG. 6, the M-EP pattern differs in two important differences. First, the discovery of the nearby vehicle is managed by the intermediate device or a network, represented by the base station 705 in FIG. 7. Thus, in this pattern, the traffic light 701 plays the role of an intermediary among multiple agents. As illustrated in FIG. 9, in the initialization step 9100, all vehicles in its vicinity (in this case RU-A and RU-C) perform an initial protocol 9110 of authentication, handshake and synchronization, after which the vehicle RU-A, which may not be aware of other vehicles nearby, asks (step 9120) the traffic light 701 if there are other vehicles and/or mobile agents (indicated with RU—Road Units—in FIG. 9) nearby.

The traffic light responds (step 9130) by sending the list of mobile agents nearby and an address of them to be used by vehicle A to connect with them via the traffic light.

The subsequent steps of establishing the virtual bus 9200 and exchanging data 9300 between two agents take place in a manner similar to the D-EP case described above, except that the fixed agent, the traffic light 701, plays a role of repeater or relay between the two agents. In detail, in the example of FIG. 9, the vehicle RU-A checks from the list sent in step 9130 the presence of the vehicle RU-C and sends a request 9210 for information on the vehicle RU-C which is received by the traffic light 701 and forwarded to the vehicle RU-C, which responds (9220) by sending the table 1, indicated above, to the traffic light 701 which then forwards it to the vehicle RU-A. Next, the vehicle RU-A requests (step 9230) information on the sensors of the vehicle RU-C. Also in this case, the request is received by the traffic light 701 which forwards it to the vehicle RU-C, which responds by sending table 2 (step 9240).

At this point, as described above for the D-EP case, the vehicle RU-A will be able to request (step 9310) data directly from the vehicle RU-C sensors by sending a request to the virtual address of the sensor, e.g., yy.yy.yy:1. The request is then forwarded to the vehicle sensor RU-C which proceeds to send the requested data to the traffic light which forwards them to the requesting vehicle RU-A. Other requests may be sent to other sensors, for example the request 9330 in FIG. 9 is sent to the sensor yy.yy.yy:2, which will send its data.

With respect to the D-EP communication, possible failures and/or reductions in quality of the UHDLL link may occur between the vehicle RU-A and the traffic light 701 or between the vehicle RU-C and the traffic light 701. In the former case, the LL backup link is used between RU-A and traffic light 701 without any impact on the communication link between RU-C and traffic light, while in the second case, where the UHDLL link between RU-C and traffic light 701 fails, the data rate between RU-A and traffic light is also reduced accordingly.

Figure 10:
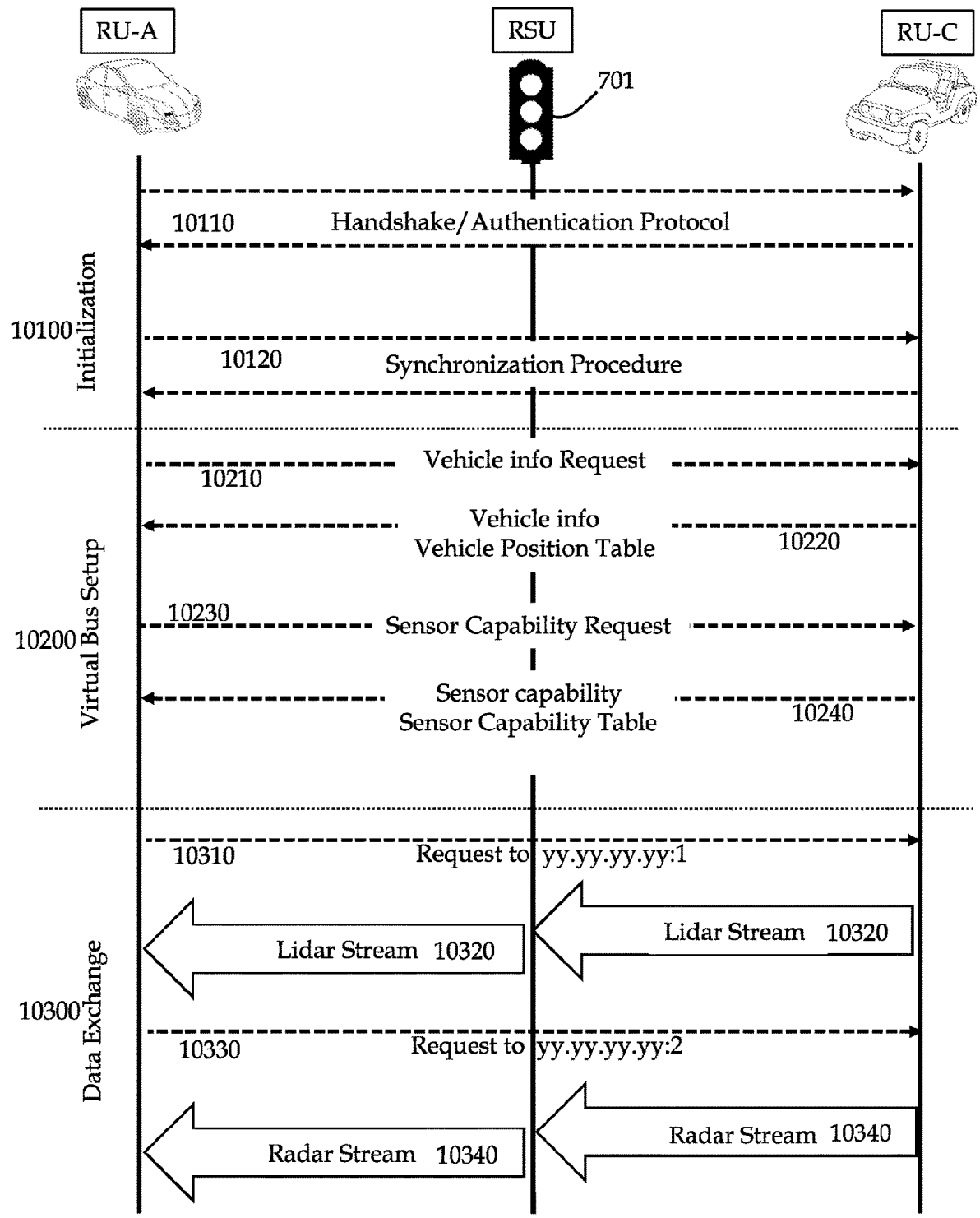
FIG. 10 illustrates a hybrid communication pattern in which two communication interfaces are exploited to implement vehicle-to-vehicle (V2V) and/or vehicle-to-infrastructure (V2I) links.

The H-EP pattern, is illustrated in FIG. 10, where the dashed line shows the communications on the channel 030 LL, whereas the thick arrow shows the communications on channel 020 UHDLL. According to this pattern, it is possible to establish a V2V link between the communication interfaces LL 230 and a V2I, or V2N, link between the communication interfaces UHDLL 220 and vice versa. In other words, this pattern allows two agents to exchange messages partly by direct communication, and partly by exploiting a third agent acting as a relay. In the example of FIG. 10, the vehicle RU-A and RU-C exchange direct communications via the LL interface, while using the UHDLL interface by exploiting the traffic light 701 as a relay. In particular, with reference to the example in FIG. 10, all the communications relating to the step of initialization (10100) and of virtual bus set-up (10200) take place directly via the LL interface. With reference to the data exchange (10300), on the other hand, the data requests to the sensors of the vehicle RU-C (10310, 10330) are sent by the vehicle RU-A directly via the LL interface, while the sensor of the vehicle RU-C sends the requested data (10320,10340) to the vehicle RU-A by exploiting the traffic light 701 as a relay. Obviously other combinations are possible, for example the vehicle RU-A and the vehicle RU-C could use the traffic light 701 as a relay for the initialization step, and then switch to a direct communication type.

From the above description of some examples of preferred embodiments of the invention, it is clear how the invention enables the achievement of the intended purposes by allowing for a cooperative perception among vehicles compatible with current bandwidth constraints.

However, it is clear that the examples provided above are not to be interpreted in a limiting sense and the invention as conceived is subject to numerous modifications and variants all falling within the scope of the present invention according to the appended claims.

For example, it is clear that different circuit blocks can be merged or decomposed differently while still providing the same functions as described above. Equally, the information that is transmitted with the messages described in the examples of FIGS. 1-10, may be differently organized and transmitted, for example the information transmitted with Tables 1 and 2 may be transmitted with a single message and/or be differently organized to be transmitted with subsequent messages, for example one for each sensor. Again, although in the above example the road surveillance devices are fixed, e.g. they are cameras or traffic lights, it is however possible that such surveillance devices are mobile, e.g. they could be integrated into devices that can be worn by a pedestrian (e.g. a backpack or a smartphone) or, again, be vehicles. A road surveillance device, therefore, may be a vehicle equipped with environmental sensors and communication units as described above, for example, with reference to FIG. 4.

The invention, therefore, finds application in the communication between two agents capable of establishing a virtual bus to allow a selective acquisition of information of interest. As explained above, an agent can request data from a sensor of another agent (fixed or mobile) and the data can be requested according to a criterion that depends on the features of the queried sensor, e.g. the latter is a camera filming a certain volume of space, a request to receive only the data of a portion of interest of such space can be made. However, the selection criterion may also depend on factors external to the agent. For example, in the example of FIG. 7, the radio base station 705 is an access apparatus adapted to allow access to a telecommunications network, and at the same time it is an agent capable of establishing a virtual bus with one of the other agents located in its coverage area. For example, the radio base station 705 is able to connect to the vehicle RU-C to request data of one of its on-board sensors in the manner described above. In the example of FIG. 7, the base station 705 is configured to receive from a remote control centre 706—for example through the internet network 707—a request to query the vehicle RU-C. The base station 705 thus requests from the second agent the control parameters and the features of the on-board sensors of the vehicle RU-C, which will respond by sending the table 2 and optionally the table 1 described above. At this point, the base station 705 will be able to directly query the on-board sensors of the vehicle RU-C, for example the telemetry sensor, to obtain data depending on the features of the sensor and the request received from the remote control system. Subsequently, the base station 705 transmits to the control centre the data of the queried sensor received via the radio communication unit 200 with which the base station is equipped.

The invention claimed is:

1. A method of communication between two agents, at least agent being a mobile vehicle, wherein a first agent communicates with a second agent comprising a sensor, wherein the second agent sends to the first agent, via a radio link, features and control parameters of the sensor necessary to query the sensor, the control parameters including at least one virtual address of the sensor, wherein the first agent sends to the sensor a request for data selected by the first agent on the basis of a selection criterion dependent on the features of the sensor, said request being generated using the control parameters of the sensor, and being sent through the radio link using the virtual address, and wherein the second agent receives the request of the first agent via a virtual reception port associated to the sensor, the virtual reception port sends a forwarded request on a local communication bus to which the sensor is connected, the sensor receives the forwarded request and, in response to the forwarded request, sends data to a virtual transmission port, and an encoder of the second agent receives data from the sensor via the virtual transmission port, encodes the data, and the second agent sends to the first agent the sensor's data requested with said data request.

2. The method according to claim 1, wherein the first agent comprises a processing and control unit and a communication unit, wherein the processing and control unit requests data from the sensor by sending a request message, on a local communication bus to which the communication unit is connected, using the virtual address of the second sensor, and wherein the communication unit transmits the request message via the radio link.

3. The method according to claim 2, wherein the first agent activates a virtual communication bus with the second agent, and wherein activation of the communication bus comprises assigning a virtual address to the sensor included in the second agent and creating, in the first agent and in the second agent, a virtual transmission port associated with the sensor of the second agent.

4. The method according to claim 3, wherein the second agent evaluates the quality of the radio link and varies the data rate of the sensor according to the quality of the radio link.

5. The method according to claim 1, wherein one among the first agent and the second agent assigns to the data of the sensor to be transmitted an order of priority and wherein the second agent transmits the data of the sensor according to said order of priority.

6. The method according to claim 5, wherein the second agent informs the first agent of an encoding method used to compress the data of the sensor and wherein the second agent transmits to the first agent the data of the sensor encoded according to said encoding method.

7. The method according to claim 6, wherein the first agent and the second agent both comprise a first radio communication interface and a second radio communication interface, the second radio communication interface configured to transmit data at a maximum data rate lower than the maximum data rate of the first communication interface, and wherein the first agent and the second agent are configured to switch from a first communication with the first communication interface to a second communication with the second communication interface.

8. The method according to claim 7, wherein the second agent transmits data generated by the sensor to the first agent without performing any data processing other than processing necessary for transmission over the radio link, such as compression and/or fragmentation.

9. The method according to claim 8, wherein the sensor is a camera or a lidar or a radar adapted to acquire data from a space surrounding the second agent, and wherein the selection criterion adopted by the first agent is to select data from a portion of said space.

10. Method according to claim 9, wherein the first agent is a vehicle comprising a local sensor, wherein said local sensor is a camera or a lidar or a radar, wherein the first agent combines data from the sensor with data from the local sensor to define or determine the presence of objects around the first agent and to control vehicle actuators to avoid such objects and/or to activate audible and/or visual warning devices to signal alarm situations for the driver of the vehicle.

11. The method according to claim 10, wherein the second agent sends to the first agent the control parameters and features of the sensor within a table of sensors, wherein the second agent includes a number of available sensors which can be queried by the first agent, and wherein said table of sensors comprises all the available sensors with all the detection capabilities of said available sensors, and control parameters for querying each of said available sensors, said control parameters including a virtual address of each of said available sensors.

12. The method according to claim 11, wherein the first agent sends the request of data from the sensor to a third agent requesting the third agent to process the sensor data to detect objects in the space surrounding the first agent, wherein the third agent:

activates a virtual bus with the second agent, requests data from the sensor based on the first agent's request, processes the data of the sensor to detect objects in the space surrounding the first agent, and transmits to the first agent the result of the processing of the sensor's data.

13. The method according to claim 12, wherein a plurality of external agents request different data generated by the sensor, and wherein the virtual transmission port allocates for each request a respective memory area where to temporarily store data sent by the sensor in response to the respective requests, and wherein the virtual port transfers to the encoder, upon request of the latter, the data to be transmitted to the external agents in response to each data request received by the external agents.

14. An agent, comprising:

a processing and control unit configured to control the operation of the agent, and a radio communication unit operatively connected to the processing and control unit and adapted to establish a radio link with a second agent equipped with at least one sensor, wherein the radio communication unit includes:

a radio communication interface adapted to establish the radio link to transmit and receive radio signals, an encoding apparatus adapted to encode local data to be transmitted and transferred to the communication interface, a decoding apparatus adapted to decode signals received from the communication interface to decode data included in radio signals received from the communication interface, a virtual transmission port for receiving the local data to be transmitted from a local communication bus and for transmitting said local data to be transmitted to the encoding device, a virtual reception port for receiving decoded data from the decoding apparatus and transmitting it to the local communication bus, and a virtual bus processing unit configured to set up the virtual transmission port to receive from the local communication bus data requests addressed to a virtual address of the sensor and to transmit the received data requests to the encoding apparatus, said virtual address identifying an address on the virtual communication bus accessible by both the sensor and the processing and control unit, wherein the radio communication unit is configured to receive from agent, via the radio link, features of the sensor and control parameters necessary to query the sensor, and to transmit the features of the sensor and the received control parameters to the processing and control unit, the control parameters including the virtual address of the sensor, and wherein the processing and control unit is configured to use the control parameters of the sensor to send a request to the sensor for data selected according to a selection criterion dependent on said features of the sensor.

15. The agent according to claim 14, wherein the virtual bus processing unit is operationally connected to the encoding apparatus and to the decoding apparatus to change coding used by the encoding apparatus and by the decoding apparatus.

16. The agent according to claim 15, wherein the virtual bus processing unit is operationally connected to the radio communication interface and is configured to monitor the quality of the radio link and to send commands to the encoding apparatus to vary, according to the quality of the radio link, the data rate on the radio link and/or to change radio link.

17. The agent according to claim 16, wherein the encoding apparatus assigns the data to be encoded a priority order and supplies the coded data to the communication interface according to said priority order.

18. The agent according to claim 17, wherein the virtual bus processing unit is configured to receive information of a fragmentation coding used by the second agent to fragment the data of the sensor, and is also configured to signal said fragmentation coding to the decoding unit to enable the decoding of data transmitted over the radio link by the second agent.

19. The agent according to claim 18, including a second radio communication interface, the second radio communication interface being configured to transmit data at a maximum data rate lower than the maximum data rate of said communication interface, and wherein the virtual bus processing unit is configured to switch from a first communication with the communication interface to a second communication with the second communication interface.

20. The agent according to claim 19, wherein the agent is a vehicle, and wherein the processing and control unit is configured to use the data received from the sensor to identify objects in the vehicle environment and to control the vehicle in such a way as to avoid the identified objects.

21. The agent according to claim 20, wherein the agent is an access device suitable for providing access to a telecommunications network, and wherein the access device is configured:

to receive a request from a control centre to query the second agent, to request the control parameters and features of the sensor from the second agent via said radio link, to transmit the data of the sensor received via the radio communication unit (200) to the control centre.

22. The agent according to claim 21, wherein the radio communication unit is configured to transmit a table of available sensors which can be queried by other agents, and wherein said table includes all the available sensors with all the detection capabilities of said available sensors, and control parameters for querying each of said available sensors, said control parameters including a virtual address of each of said available sensors.

23. A communication system comprising at least two agents according to claim 14.

* * * * *